United States Patent Office 3,509,857
Patented May 5, 1970

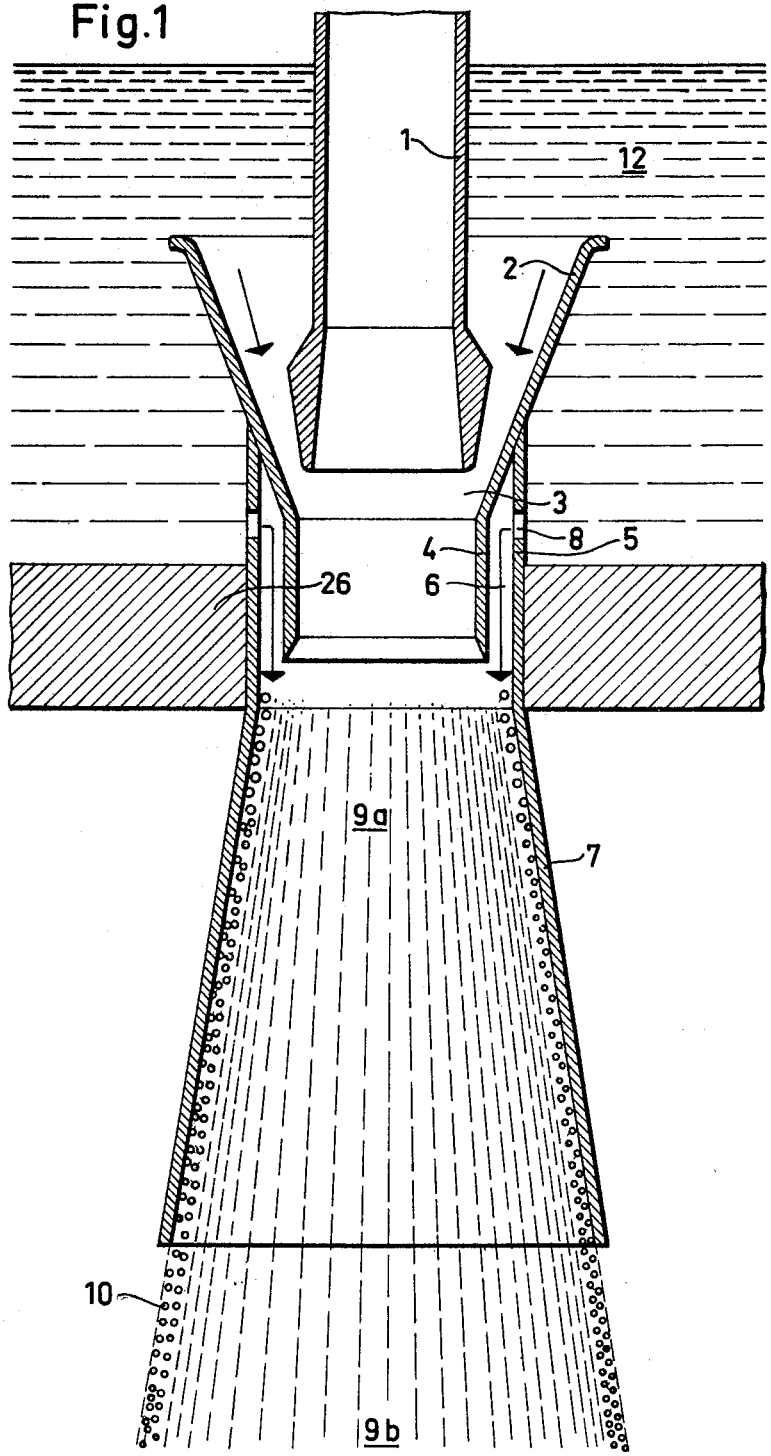

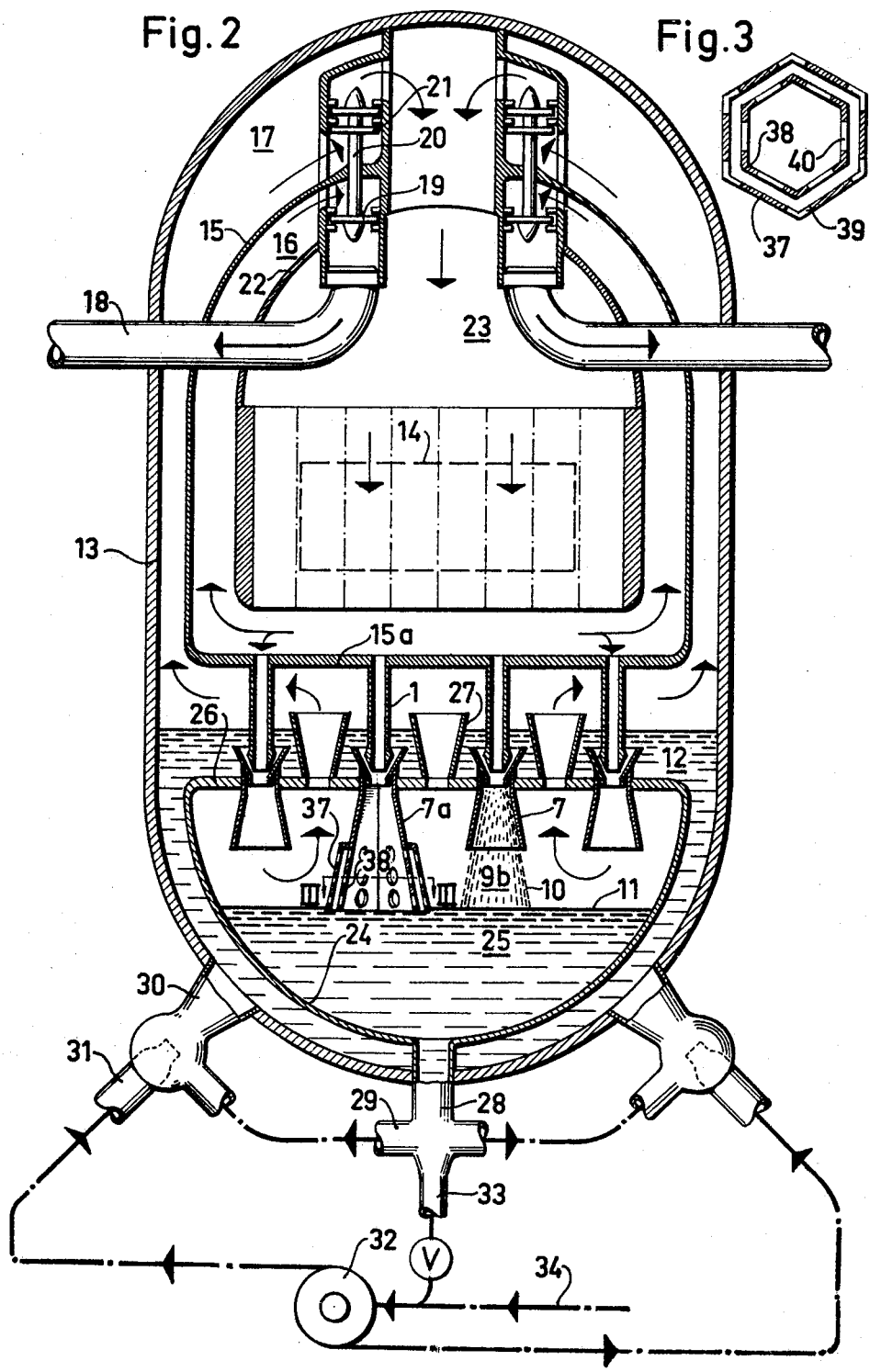

3,509,857
DEVICE FOR PRODUCING SATURATED STEAM
FROM SUPERHEATED STEAM AND WATER
Karl Gunnar Dillstrom, Lidingo, Sweden, assignor to
Aktiebolaget Atomenergi, Stockholm, Sweden
Filed Dec. 12, 1967, Ser. No. 689,937
Claims priority, application Sweden, Jan. 13, 1967,
556/67
Int. Cl. F22b 1/08
U.S. Cl. 122—31                                    4 Claims

ABSTRACT OF THE DISCLOSURE

The invention is concerned with a nozzle in which water is atomized and evaporated by superheated steam. Part of the water is introduced into the nozzle in such a way as to form a curtain of comparatively big drops. The steam passing through said curtain is filtered, resulting in a pure steam containing no water droplets and no particles originating from salts dissolved in the water.

---

The invention is concerned with a device for producing saturated steam from superheated steam and water. The device is of the known type comprising a nozzle for mixing steam and water by introducing the steam in the centre of the nozzle and introducing the water through a peripheral, annular opening, the water being atomized and vaporized by the steam.

If the water contains small quantities of solid substances, for instance salts dissolved in the water, said substances will appear in the saturated steam thus produced. The saturated steam may also contain small water droplets. For some purposes, for instance if the steam is to be used as coolant in a nuclear reactor, it is important that the steam is absolutely free from solid substances and water droplets. The object of the invention is to provide a non-complicated steam producing device of the type mentioned above, producing pure steam.

The device of the invention is characterized in that the nozzle for mixing steam and water contains, in addition to the annular opening mentioned above and referred to as the primary water inlet opening, a second annular opening, referred to as the secondary water inlet opening, for the introduction of water, the secondary water inlet opening being situated nearer the outlet opening of the nozzle and having a diameter larger than that of the primary water inlet opening, resulting in the water originating from the secondary water inlet opening forming a curtain of droplets which are larger than those originating from the primary water inlet opening, the curtain of droplets originating from the secondary water inlet opening impinging on a surface provided at some distance from the nozzle whereas the saturated steam thus produced deviates transversely and is filtered during its passage between the curtain of droplets.

The invention will now be explained with reference to the accompanying drawings. FIG. 1 illustrates a steam producing device according to the invention, and FIG. 2 illustrates a nuclear reactor containing the device of FIG. 1. FIG. 3 illustrates a section on line III—III in FIG. 2.

The illustrated steam producing device consists of a nozzle for mixing steam and water, and said nozzle contains a central tube 1 for the supply of superheated steam, and a conical member 2 for the supply of water 12. The tube 1 and the member 2 define an annular water inlet opening 3. The conical member 2 has an extended cylindrical portion 4. Within said cylindrical portion 4 the water is atomized by the superheated steam. A second cylindrical member 5 is provided to be coaxial with the cylindrical portion 4. The two cylindrical members 4 and 5 define an annular space 6 having an open lower portion. The cylindrical member 5 contains openings 8 for the introduction of water into the space 6. The cylindrical member 5 has an extended conical portion 7 widening downwardly.

The steam producing device of FIG. 1 is mounted in the nuclear reactor of FIG. 2. The reactor is a steam-cooled fast reactor, and contains a pressure vessel 13 containing a reactor core 14 containing the fissile fuel. The reactor core is surrounded by a shield 22 having open top and bottom portions. The shield 22 is surrounded by a container 15 having a bottom 15a and an open top portion. The top portion of the pressure vessel contains a plurality of turbines 19 having their inlet opening communicating with the space 16 defined between the shield 22 and the container 15, and having their outlet opening communicating with an outlet tube 18. Each turbine 19 is connected by means of a shaft 20 to a compressor 21. The inlet opening of the compressor communicates with the space 17 defined between the container 15 and the pressure vessel 13, and the outlet opening communicates with a central space 23 in the upper portion of the reactor.

The lower portion of the reactor contains a container 24 having a plane top wall 26 and a substantially semi-spherical lower portion. The container 24 is surrounded by water 12, and is partially filled with water 25, and has an outlet 28 in its bottom. This outlet 28 communicates through conduits 29 with a plurality of inlet tubes 30 in the bottom of the pressure vessel. The outlet 28 also communicates through a conduit 33 with a feed water pump 32 having its outlet opening communicating with injector nozzles 31 in the inlet tubes 30.

A plurality of steam producing devices as illustrated in FIG. 1 are mounted in openings in the plane upper wall 26 of the container 24, the conical outlet portions 7 being directed downward towards the surface 11 of the water 25 in the container 24. The plane upper wall 26 also contains a plurality of openings connected to conical tubes 27 extending upwardly from the wall 26. The central inlet tubes 1 of the steam producing devices have their upper ends connected to openings in the plane bottom wall 15a of the container 15.

The illustrated reactor operates in this way. Feed water is supplied from a conduit 34 to the pump 32 and is supplied to the reactor through the injector nozzles 31. The injector nozzles create a pressure difference, and this pressure difference transports water from the space 25 to the space 12. Said water 12 enters into the steam producing devices through their water inlet openings 3 and 6, owing to the static pressure of the water and owing to the injector action of the steam jet. The cross sectional area of the nozzle is larger at the secondary water inlet opening 6 than at the primary water inlet opening 3, and consequently the steam velocity is lower at the secondary water inlet opening 6. Owing to the known fact that the size of the droplets is inversely proportional to the steam velocity, the water originating from the secondary water inlet opening will form larger droplets than will the water originating from the primary water inlet opening. The comparatively big droplets originating from the vertical secondary water inlet opening 6 will produce a curtain along the wall of the outlet portion 7. Consequently, a jet will result, extending from the outlet portion 7 to the water surface 11 and having an outer curtain 10 consisting of water droplets. The distance between the outlet portion 7 and the water surface 11 is so chosen that the droplets of the curtain 10, originating from the secondary water inlet opening 6, will not be completely vaporized before they reach the water surface 11, whereas the droplets originating from the primary water inlet opening 3 will be vaporized. Therefore, the central portion of said jet will consist of an upper zone 9a containing steam and water droplets in a state of vaporization, and a lower zone 9b containing substantially dry steam. Said substantially dry steam, however, may contain a few water droplets, and it also contains extremely fine solid particles of salts having been dissolved in the water. Said substantially dry steam has to deviate transversely through the curtain 10 of droplets. This results in the curtain of droplets filtering the steam so as to remove said few droplets and solid particles. The filtered steam leaves the container 24 through the conical tubes 27 and passes through the space 17 to the compressors 21. Said compressors 21 move the steam down through the space 23 and the reactor core 14 in which the steam is superheated. One portion of the superheated steam passes downward through the inlet pipes 1 of the steam producing devices. Another portion passes upward through the space 16 to the turbines 19 and is withdrawn through the tubes 18. Consequently, the superheated steam is used for transporting the saturated steam in the reactor.

FIG. 2 also illustrates one steam producing nozzle 7a of a slightly modified design. The outlet portion of the nozzle has a hexagonal cross-sectional shape, and it has an extended portion 38 which is also of a hexagonal cross-sectional shape and which has its lower end situated below the water surface 11. The walls of the extended portion 38 contain openings 40. The extended portion 38 is surrounded by an outer casing 37 having also a hexagonal cross-sectional shape. The outer casing 37 has openings 39 in the corners between the plane side walls. The extended portion 38 acts stabilizing on the curtain 10 of droplets, making the curtain effective for filtering the steam within a wide range of steam flow per unit of time. When the steam passes through the openings 39, 40 it will have to change its direction, and consequently water droplets accompanying the steam will be separated.

What is claimed is:

1. In a steam-cooled nuclear reactor comprising a reactor core containing nuclear fuel, means for passing saturated steam as a coolant through the reactor core, a plurality of vaporization nozzles having a vertical direction of flow, a water surface below said vaporization nozzles, means for supplying water to said vaporization nozzles, means for supplying superheated steam from the reactor core to said vaporization nozzles to atomize and vaporize said water, and means for passing saturated steam thus produced back to another circulation through the reactor core, the improvement consisting in that said vaporization nozzles comprise a central steam inlet member, a first peripheral annular water inlet opening, referred to as the primary water inlet opening, a second annular water inlet opening, referred to as the secondary water inlet opening, the secondary water inlet opening being situated nearer the outlet opening of the nozzle and having a diameter larger than that of the primary water inlet opening, resulting in the water originating from the secondary water inlet opening forming a curtain of droplets which are larger than those originating from the primary water inlet opening, the curtain of droplets originating from the secondary water inlet opening impinging on the water surface provided below the vaporization nozzles whereas the saturated steam produced in the nozzles deviates transversely and is filtered during its passage between the curtain of droplets.

2. A device as defined in claim 1, in which the inlet portion of the nozzle is designed to be immersed in water during operation, and in which the primary water inlet opening is defined by a steam inlet tube and a conical water inlet member, and in which the secondary water inlet opening is defined by a first cylindrical wall which is an extension of a conical water inlet member and by a second cylindrical wall which is coaxial with the first cylindrical wall and which contains water inlet openings, said second cylindrical wall having an extended conical portion widening to form the outlet of the nozzle.

3. A device as defined in claim 2, in which the outlet portion of the nozzle has an extended portion extending between the nozzle and said surface and having openings in its wall.

4. A device as defined in claim 3, in which the extended portion of the nozzle has double walls, the openings of the outer wall being so displaced relatively to the openings of the inner wall as to serve as a trap for water droplets accompanying the same.

References Cited

UNITED STATES PATENTS

| | | | |
|---|---|---|---|
| 1,808,424 | 6/1931 | Manifold | 122—31 XR |
| 2,328,414 | 8/1943 | Beyer | 122—31 |
| 3,154,140 | 10/1964 | Esselman et al. | |

KENNETH W. SPRAGUE, Primary Examiner